United States Patent [19]
DeWoskin

[11] Patent Number: 5,470,116
[45] Date of Patent: Nov. 28, 1995

[54] DEVICE FOR HOLDING PRESSURE-SENSITIVE ADHESIVE TAPE FOR ADHESIVELY GRIPPING ITEMS TO BE GRIPPED AND METHOD OF MANUFACTURE

[75] Inventor: Irvin S. DeWoskin, St. Louis, Mo.

[73] Assignee: Barnhart Industries, Inc., Barnhart, Mo.

[21] Appl. No.: 214,807

[22] Filed: Mar. 16, 1994

[51] Int. Cl.⁶ .................................................. B65H 3/20
[52] U.S. Cl. ............................................................ 294/1.1
[58] Field of Search ........................... 294/1.1, 25, 902; 15/104.002; 221/210; 271/33

[56] References Cited

U.S. PATENT DOCUMENTS

| | | | |
|---|---|---|---|
| 2,600,068 | 6/1952 | Meyers | 294/1 |
| 2,610,882 | 9/1952 | Sutliffe | 294/1 |
| 2,702,913 | 3/1955 | Walkama | 15/104.002 |
| 2,708,761 | 5/1955 | Bergquist | 15/104.002 |
| 3,330,077 | 7/1967 | Kanbar et al. | 15/104.002 X |
| 3,336,616 | 8/1967 | Martin | 15/104 |
| 3,471,977 | 10/1969 | Roth | 15/104.002 X |
| 4,073,530 | 2/1978 | Seidler | 294/19 R |
| 4,600,227 | 7/1986 | Ennis et al. | 294/1.1 |
| 4,642,835 | 2/1987 | Schmitz | 15/104.002 |
| 4,653,789 | 3/1987 | McWilliams et al. | 294/1.1 |
| 4,836,592 | 6/1989 | Roberts | 294/1.1 |
| 4,848,815 | 7/1989 | Molloy | 294/1.1 |
| 4,887,858 | 12/1989 | Gazzarrini | 194/1.1 |
| 4,905,870 | 3/1990 | Mamolou | 294/1.1 X |
| 4,934,010 | 6/1990 | Tarlton | 15/104 A |
| 4,957,217 | 9/1990 | Ritson | 294/1.1 X |

*Primary Examiner*—Dean Kramer
*Attorney, Agent, or Firm*—Senniger, Powers, Leavitt & Roedel

[57] ABSTRACT

A device for holding a length of pressure-sensitive adhesive tape for adhesively gripping an item to be gripped as for gripping a paper coffee filter to pick it up from a stack of such filters wherein the pressure-sensitive adhesive on the tape itself is used for holding the tape in place on the device.

14 Claims, 3 Drawing Sheets

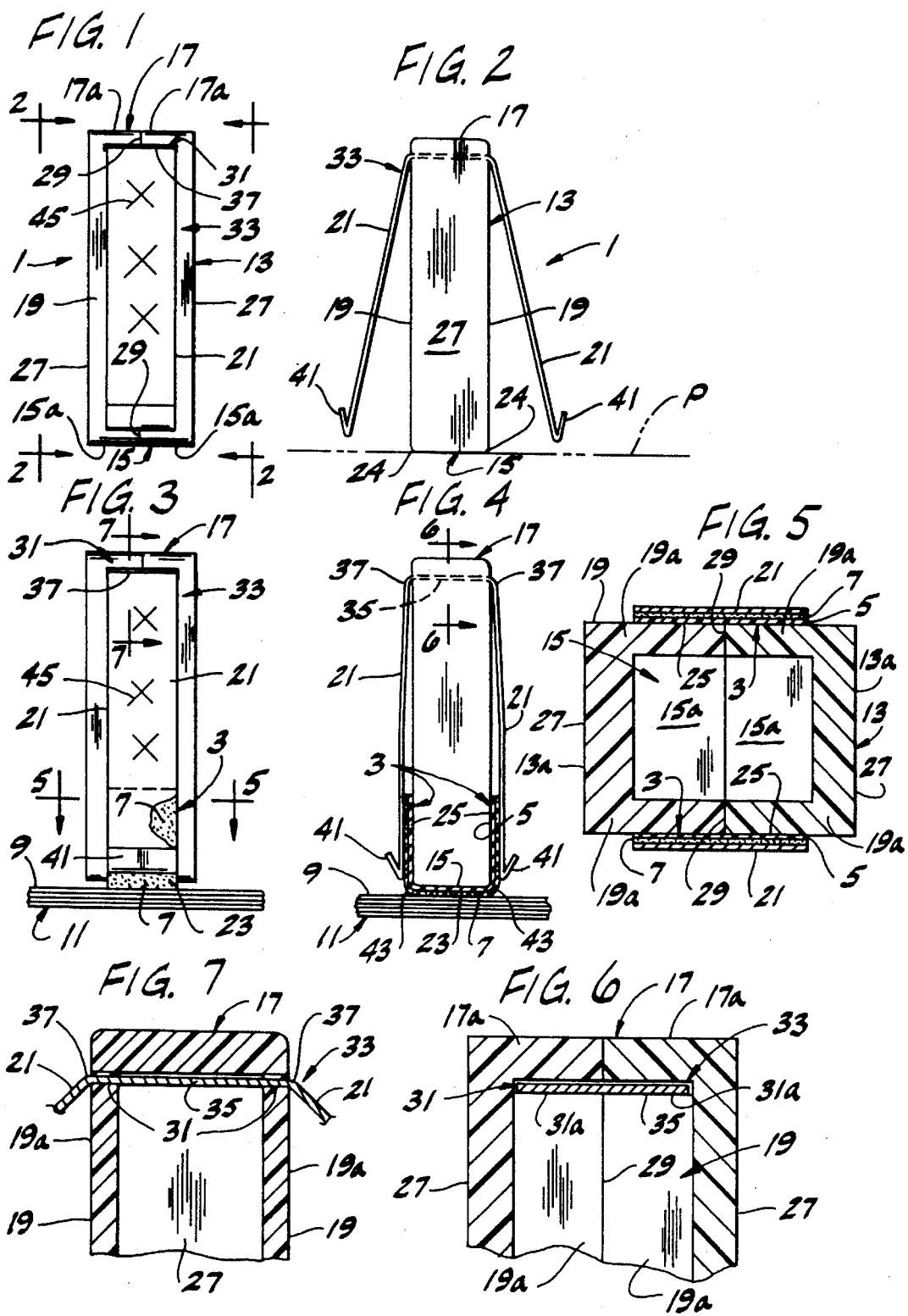

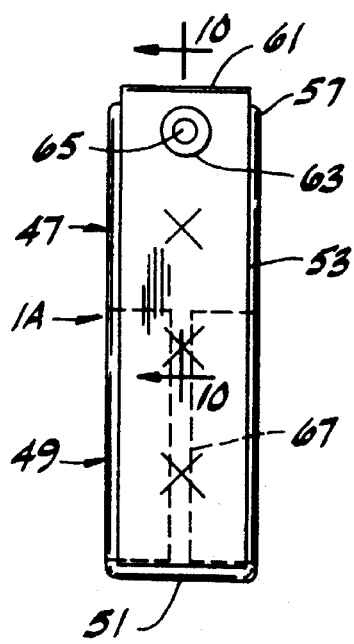
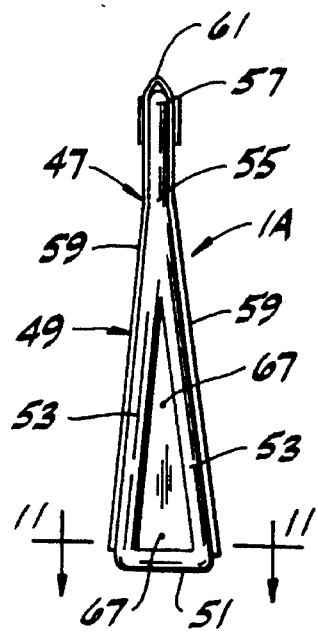
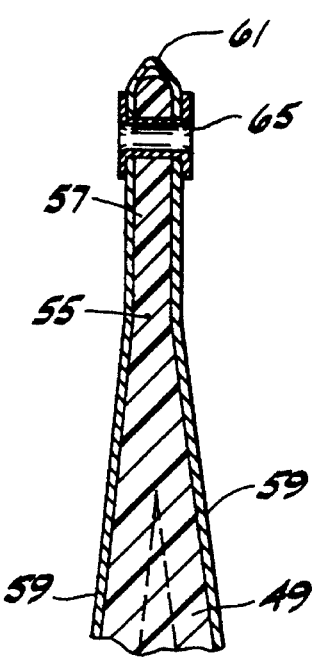
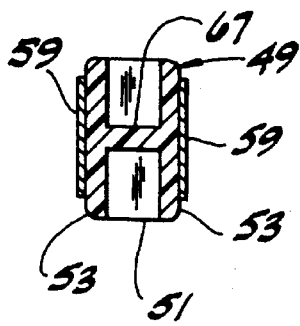
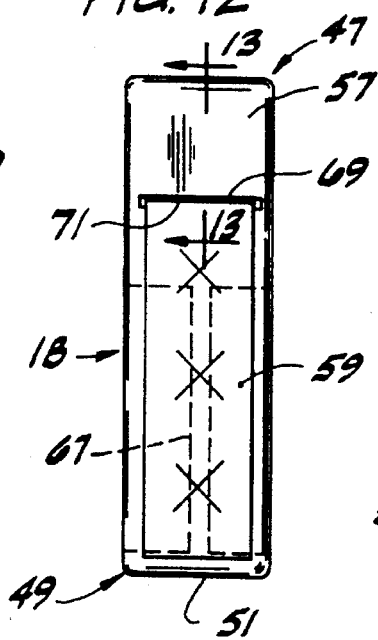
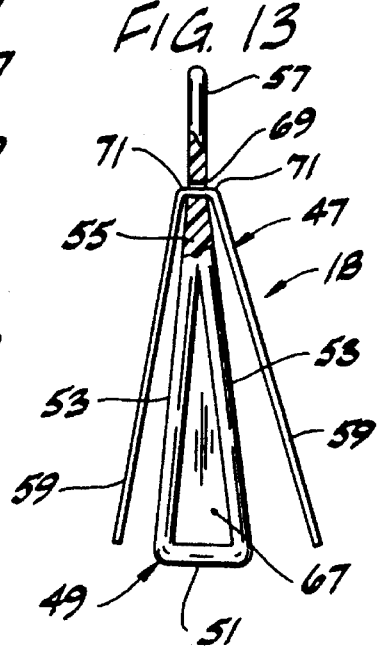

DEVICE FOR HOLDING PRESSURE-SENSITIVE ADHESIVE TAPE FOR ADHESIVELY GRIPPING ITEMS TO BE GRIPPED AND METHOD OF MANUFACTURE

BRIEF SUMMARY OF THE INVENTION

This invention relates to devices for holding pressure-sensitive adhesive tape for adhesively gripping items to be gripped, and more particularly to a hand-held device for holding a length of pressure-sensitive adhesive tape for such uses as adhesively gripping a paper coffee filter and picking it up off a stack of such filters, and for adhesively gripping one wall of a plastic bag and pulling it away from the other wall to open the bag, and to a method of manufacturing same.

Among the several objects of the invention may be noted the provision of a simple, inexpensive easy-to-use device for purposes such as above described adapted for ready application thereto of a length of pressure-sensitive adhesive tape with the tape disposed for having its adhesive side pressed against an item to be gripped, e.g. an item of sheet material; the provision of such a device particularly for adhesively gripping an item of sheet material and separating it from an adjacent item of sheet material, e.g. for adhesively gripping the uppermost paper coffee filter of a stack of such filters and picking it up from the stack, the item of sheet material then being readily separable from the tape; the provision of such a device enabling easy removal therefrom of the length of pressure-sensitive adhesive tape when its adhesive capability is diminished as by repeated use of the device; the provision of such a device wherein the pressure-sensitive adhesive on the tape is itself used for holding the tape in place on the holder and wherein a spent tape is readily removed from the holder; the provision of such a device which is receptive of various pressure-sensitive adhesive tapes on the market; the provision of such a device adapted to serve as an advertising novelty carrying advertising information; and the provision of a method of economically manufacturing same.

In general, a device of this invention is adapted to hold a length of pressure-sensitive adhesive tape for utilization of the tape adhesively to grip an item to be gripped, the tape being of the type comprising a backing strip and a pressure-sensitive adhesive on one face of the backing strip. The device comprises a holder having a first end, a second end and opposite sides, with a base at the first end having opposite side edges, said holder being formed for being gripped by the fingers of the user at said second end thereof, and being adapted for application thereto of a length of pressure-sensitive tape to have a base portion of the tape extending adhesive side out across the base of the holder and folded around said opposite side edges of the base to have side portions extending over the sides of the holder also with the adhesive side of the tape out. The holder further has a pair of flaps, one at each side thereof, each flap having an end joined to the holder and extending over a respective side of the holder free of the respective side of the holder toward the respective side edge of the base of the holder. The flaps are capable of being swung out for the folding of the tape around the opposite side edges of the base to have the said side portions of the tape extend over the sides of the holder, and then being pressed down against said side portions of the tape for being adhesively secured to said side portions, and the flaps are peelable away from said side portions for replacement of the tape. The holder with the tape thereon is adapted to be gripped by the fingers of the user at its said second end and moved to press the adhesive face of said base portion of the tape against an item to be gripped adhesively to grip said item.

The device may be made with the flaps formed of sheet plastic material or with the holder and flaps integrally formed of plastic. The method of the invention generally involves the manufacture of the latter type by extruding plastic to form an extrusion having a body portion and flap portions at opposite sides of the body portion and segmenting the extrusion into individual units each comprising a holder with the integral flaps.

Other objects and features will be in part apparent and in part pointed out hereinafter.

BRIEF DESCRIPTION OF THE DRAWINGS

FIG. 1 is a view in side elevation of a device of this invention prior to application of a length of pressure-sensitive adhesive tape thereto;

FIG. 2 is a view on either of lines 2—2 of FIG. 1, showing the flaps of the device in a swung-out position;

FIG. 3 is a view similar to FIG. 1 showing the device with a length of pressure-sensitive adhesive tape applied thereto and held thereby;

FIG. 4 is a view similar to FIG. 2, showing the flaps in their swung-in tape gripping position;

FIG. 5 is an enlarged section on line 5—5 of FIG. 3;

FIG. 6 is an enlarged section on line 6—6 of FIG. 4;

FIG. 7 is an enlarged section on line 7—7 of FIG. 3;

FIG. 8 is a view similar to FIG. 1 showing a second version of the device of this invention;

FIG. 9 is a view similar to FIG. 2 of the FIG. 8 modification;

FIG. 10 is an enlarged section on line 10—10 of FIG. 8;

FIG. 11 is a view in section on line 11—11 of FIG. 9;

FIG. 12 is a view similar to FIG. 8 of a third version of the device of this invention;

FIG. 13 is a view similar to FIG. 9 partly in section on line 13—13 of FIG. 12 of said third version;

Corresponding reference characters indicate corresponding parts throughout several views of the drawings.

DETAILED DESCRIPTION

Figure 14:
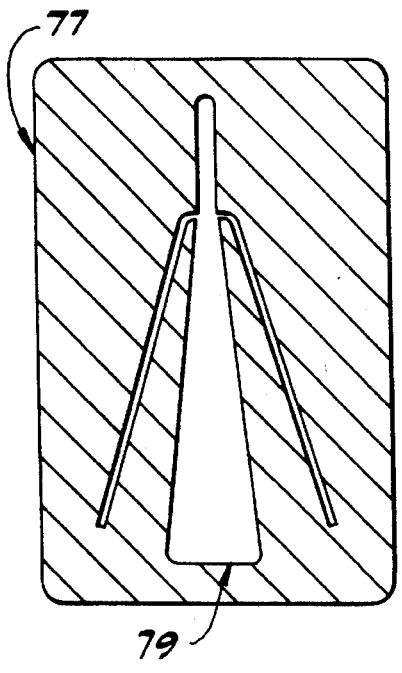
FIGS. 14 and 15 are views showing a method of this invention for manufacturing a fourth version of the device of this invention.

Referring to the drawings, first more particularly to FIGS. 1–7, indicated generally at 1 is a device of this invention for holding a length 3 of pressure-sensitive adhesive tape especially adapted for adhesively gripping an item of sheet material to separate it from another item of sheet material, utilizing pressure-sensitive adhesive tape of the type comprising a backing strip 5 and a pressure-sensitive adhesive 7 on one face of the backing strip. As illustrated in FIGS. 3 and 4, the item being gripped is a paper coffee filter 9 constituting the topmost filter of a stack 11 of such filters. The device 1 comprises an elongate holder 13 having a first end 15 and a second end 17 with a generally flat rectangular base also designated 15 at the first end and generally flat rectangular opposite sides 19. Further, the holder has a pair of flaps each designated 21, one at each side thereof, assembled therewith adjacent its said second end 17 and extending over said sides 19 free of said sides from adjacent said second end 17 toward the plane P of said first end or base 15. The holder is adapted for application thereto of the stated length 3 of pressure-sensitive adhesive tape to have a base portion 23 of the tape extending adhesive side 7 out across the base 15 of the holder and folded around the opposite side edges 24 of the base to have side portions 25 extending over the sides 19 of the holder under the flaps 21 toward the second end 17 also with the adhesive side 7 out and with the flaps adhered by the pressure sensitive adhesive 7 on the tape to said side portions 25 of the tape to hold the tape in place on the holder. The flaps are capable of being swung out for the folding of the tape around the opposite side edges of the base 15 to extend over the sides of the holder and then pressed down against said side portions of the tape for being adhesively secured to said side portions. The flaps are peelable away from said side portions 25 of the tape for replacement of the tape. The holder with the tape thereon is adapted to be gripped by the fingers of the user at its second end 17 and moved to press the adhesive face 7 of the base portion 23 of the tape against the item of sheet material 9 to be separated from the next item (see FIGS. 3 and 4) adhesively to grip it and pull it away from the latter.

In further detail, the holder 13 comprises an elongate hollow body of rectangular cross section as shown in FIG. 5 closed at one end (its lower end as illustrated in FIGS. 1–4) by a rectangular wall constituting the base end 15 of the holder, side walls extending longitudinally with respect to the holder from two opposite ends of the rectangular base end 15 forming the generally flat rectangular sides 19 of the holder, two opposite longitudinal walls each designated 27 at right angles to the walls at 19, and a second or upper rectangular end wall constituting the stated second end 17 of the holder. The holder is of two-piece construction, each piece being of elongate rectangular box form and individually designated 13a, and comprising a complete wall 27, halves 19a of the side walls 19, one half 15a of the base end wall 15 and one half 17a of the end wall 17. The two box-form pieces 13a are secured together open side to open side along the box edges as indicated at 29, i.e. along the meeting edges of wall halves 15a, 17a and 19a. Each of the wall halves 19a is provided adjacent the respective wall half 17a with transverse slits 31a extending from the edge of the wall half 19a to the wall 27, these slits 31a forming slots 31 extending transversely across the end wall 15 of the holder. Each of the box-form pieces 13a may be molded of a suitable plastic, such as polyvinyl chloride, the pieces being permanently secured together along the edges of the wall halves 19a, 15a and 17a as by ultrasonic welding.

The flaps 21 are formed by a single strip 33 of relatively stiff but flexible sheet plastic material, such as 15 mil polyvinyl chloride, have a width slightly less than the length of the slots 31 in the walls 19 of the holder. The strip extends through these slots, having a flat central portion 35 underlying the end wall 17 of the holder, the strip being folded at 37 on lines extending transversely of the strip just outside the side walls 19 to form the flaps 21 extending outwardly of the side walls 19 in a direction toward the plane P of the base 15. The folds at 37 form hinges. Each flap is in effect joined to the holder at these hinges. The strip 33 is threaded through the slots 31 and formed with bent-out finger grip portions 41 at its ends, i.e. at the free end of each flap. Each flap is of such length as to extend generally all the way to the base end 15 of the holder 13 when the flap is folded against the respective side 19 of the holder. With the strip 33 folded at 37 on opposite sides of the holder, it is held in assembly with the holder 13, i.e., it is generally restrained from slipping out of the holder.

As shown in FIGS. 3–5, and as noted above, the length 3 of pressure-sensitive adhesive tape is applied to the base end 15 of the holder to have the base portion 23 of the tape extending adhesive side 7 out across the base end 15 of the holder, and the tape is folded on lines 43 at the side edges 24 of the base end 15 to have the side portions 25 extending (up as viewed in FIG. 4) over the sides 19 of the holder back toward the end 17 of the holder also with the adhesive side 7 out. The flaps 21 are folded in to bring them into contact with the adhesive side 7 of the side portions 25 of the tape and pressed to cause them to adhere to said portions 25 of the tape. This holds the tape in place on the holder, which is then ready for use by being gripped by the fingers of the user at the end 17 of the holder and moved to press the adhesive face 7 of the base portion 23 of the tape against the item of sheet material 9 (e.g. a coffee filter) to be separated from the next item adhesively to grip it and pull it away from the latter. When the capability of the base portion of the tape to adhere to and pick up an item is diminished as by repeated usage, the finger grip ends 41 of the flaps 21 are grasped and the flaps are peeled away from the side portions 25 of the spent tape for removal of the latter, and a fresh piece of tape applied.

The device is adapted to serve as an advertising novelty carrying advertising information, as by imprinting the information on one or both of the flaps as indicated at 45 in FIGS. 1 and 3.

FIGS. 8–11 show a modification 1A of the above-described device wherein the holder, designated 47 to distinguish it from the holder 13, is narrower at the second end than at the first, the narrower end forming a finger grip. More particularly, the holder 47 has a portion constituting the main body 49 thereof, this portion being generally in the shape of a wedge. The broad end of the wedge constitutes the base 51 of the holder (corresponding to the base 15 of the device shown in FIGS. 1–7), this base again being flat and rectangular. The sides 53 of the wedge are inclined toward one another from opposite ends of the base toward the apex 55 of the wedge, where the holder has a relatively thin integral extension or web 57 forming the finger grip for the device.

The device shown in FIGS. 8–11 has flaps 59 like the flaps 21 of the device shown in FIGS. 1–7, the flaps being formed by a single strip of sheet plastic material, e.g. a strip of 15 mil polyvinyl chloride, folded as indicated at 61 around the finger grip 57 and fastened thereto as by a rivet or eyelet 63 received in a hole 65 in the finger grip, the strip having portions extending along the inclined sides 53 of the wedge constituting the flaps 59 corresponding to the aforesaid flaps 21. The holder 47 may be molded of plastic, and is preferably of hollow form with an integral central reinforcing web 67 interiorly thereof. The wedge-shaped body 49 has the shape of a slender relatively tall isosceles triangle (see FIG. 9), base 51 being the base of the triangle.

FIGS. 12 and 13 illustrate another modification 1B, which is similar to the modification 1A above described except that instead of folding the strip which is to form the flaps around the upper edge of the finger grip 57, the latter has a slot 69 therein (corresponding to the slots 31 of the device of FIGS. 1–7) extending transversely thereof adjacent the apex 55 of the wedge-shaped body 49. The strip forming the flaps is passed through this slot and folded as indicated at 71 to form the flaps 65.

Figure 15:
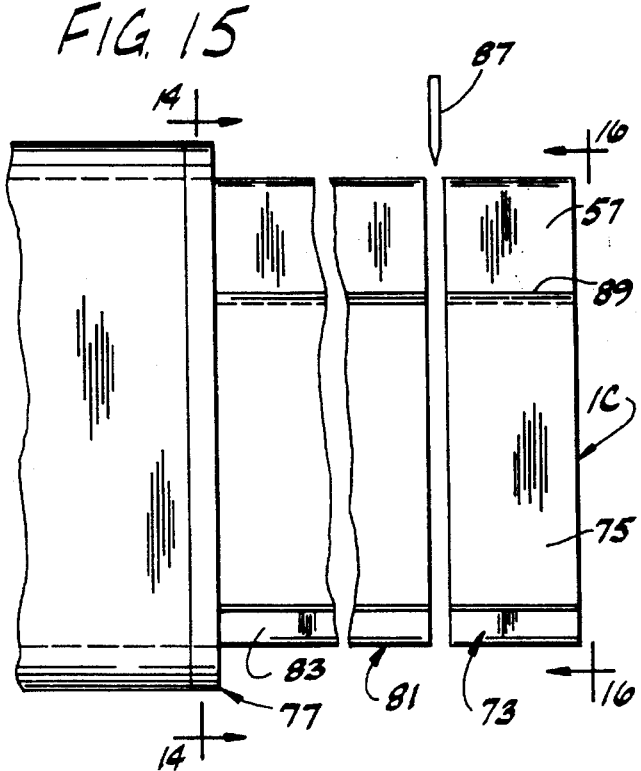
Figure 16:
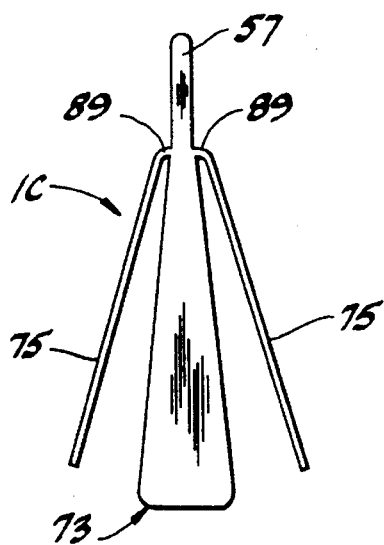
FIG. 16 is a view of the fourth version taken on line 16—16 of FIG. 15.

FIG. 14 and 15 illustrate a method of this invention for making a fourth modification 1C (FIGS. 15 and 16) which is similar to the modifications 1A and 1B above described, with the principal exception that the holder, designated 73 and the flaps each designated 75, are integrally formed of plastic instead of having the flaps formed from a separate strip. As illustrated in FIGS. 14 and 15, the 1C devices are formed by extruding plastic through an extrusion die 77 having an orifice 79 shaped to form an extrusion 81 having a body portion 83 of transverse cross-section corresponding to the transverse cross-section of the body shown in FIG. 13 (but solid instead of having the hollows such as shown in FIG. 11) and having flap portions 85 at opposite sides of the body portion integral therewith. The extrusion 81 is segmented (cut) as indicated at 87 into individual units each comprising a holder 73 (corresponding to holder 47 with the finger grip 57) with flaps 75 at opposite sides thereof integral with holder at opposite sides of the root of the finger grip 57 as indicated at 89. The plastic used is one capable of forming integral hinges, and the junctures at 89 constitute such hinges, enabling the swinging out and swinging in of the flaps. To provide said integral hinges, the plastic used may be polyvinyl chloride, polypropylene, polystyrene, high density polyethylene or the like. The extrusion 81 may be made with the body portion 83 solid so that the body of each holder is solid, as illustrated, or hollow.

Each of the devices 1A, 1B and 1C is used in the same manner as the device 1, holding in place a length of pressure-sensitive tape by adherence thereof to the flaps.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A device for holding a length of pressure-sensitive adhesive tape for utilization of the tape adhesively to grip an item to be gripped, the tape being of the type comprising a backing strip and a pressure-sensitive adhesive on one face of the backing strip, said device comprising an elongate holder having a first free end, a second free end and opposite sides, with a base at the first end having opposite side edges, said holder being relatively thin between said opposite sides thereof at its said second end constituting said second end as a finger grip for being gripped by the fingers of the user, said side edges of said base of the holder being relatively widely spaced in relation to the sides of the holder at its said second free end, said holder being adapted for application thereto of a length of pressure-sensitive tape to have a base portion of the tape extending adhesive side out across the base of the holder and folded around said opposite side edges of the base to have side portions extending over the sides of the holder also with the adhesive side of the tape out, said holder further having a pair of flaps, one at each side thereof, each flap having an end joined to the holder adjacent its said second free end and extending over a respective side of the holder free of the respective side of the holder toward the respective side edge of the base of the holder, the flaps being free of the sides of the holder from their ends where they are joined to the holder to opposite ends thereof adjacent the side edges of the base and being free at said opposite ends so as to be capable of being swung out for the folding of the tape around the opposite side edges of the base to have the said side portions of the tape extend over the sides of the holder, and then being pressed down against said side portions of the tape for being adhesively secured to said side portions, said flaps being peelable away from said side portions of the tape for replacement of the tape, the holder with the tape thereon being adapted to be gripped by the fingers of the user at its said second end and moved to press the adhesive face of said base portion of the tape against an item to be gripped adhesively to grip said item.

2. A device as set forth in claim 1 particularly for adhesively gripping an item of sheet material to separate it from another item of sheet material wherein the flaps are formed of sheet plastic material.

3. A device as set forth in claim 2 wherein the flaps are formed by a single strip of the sheet plastic material having a portion generally at the center of the length of the strip assembled with the holder at its said second end and folded to have portions constituting the flaps extending over the sides of the holder in a direction toward the side edges of said base.

4. A device as set forth in claim 3 wherein the strip forming the flaps is a strip of sheet plastic material and each flap is of such length as to extend generally all the way to the said side edges of the base of the holder when the flap is folded against the respective side of the holder, each flap having a bent-out finger grip portion at its end at said first end of the holder.

5. A device as set forth in claim 3 wherein the holder is slotted adjacent its said second end for the assembly of the strip therewith by passage of the strip therethrough, the folding of the strip to form the flaps holding it in assembly with the holder and forming hinges for the flaps.

6. A device as set forth in claim 5 wherein the strip forming the flaps is a strip of sheet plastic material and each flap is of such length as to extend generally all the way to the said side edges of the base of the holder when the flap is folded against the respective side of the holder, each flap having a bent-out finger grip portion at its end at said first end of the holder.

7. A device as set forth in claim 1 wherein at least one of the flaps is imprinted on the outside thereof with advertising information.

8. A device as set forth in claim 1 wherein the holder has a body generally in the shape of a wedge, the base being at the broad end of the wedge, the sides of the wedge being inclined toward one another from opposite side edges of the base toward the apex of the wedge, said holder further having a relatively thin integral extension from the apex of the wedge forming the finger grip.

9. A device as set forth in claim 8 wherein the flaps are formed by a single strip of sheet plastic material folded around the finger grip and fastened thereto, said strip having portions forming said flaps extending along said inclined sides.

10. A device as set forth in claim 9 wherein said strip of sheet plastic material is fastened to the finger grip by a rivet received in a hole in the finger grip.

11. A device as set forth in claim 8 wherein the finger grip extension has a slot therein extending transversely thereof adjacent the apex of the wedge-shaped body, and the flaps are formed by a single strip of sheet plastic material passed through the slot and folded to have portions constituting the flaps extending along said inclined sides.

12. A device as set forth in claim 1 wherein the holder and the flaps are integrally formed of a plastic such as to provide integral hinges for the flaps adjacent said second end of the holder.

13. A device as set forth in claim 12 wherein the holder has a body generally in the shape of a wedge, the base being at the broad end of the wedge, the sides of the wedge being inclined toward one another from opposite side edges of the base toward the apex of the wedge, said holder further having a relatively thin integral extension from the apex of the wedge forming the finger grip.

14. The method of making devices for holding a length of pressure-sensitive adhesive tape for utilization of the tape adhesively to grip an item to be gripped, the tape being of the type comprising a backing strip and a pressure-sensitive adhesive on one face of the backing strip, said device comprising a holder having a first end, a second end and opposite sides, with a base at the first end having opposite side edges, said holder being formed for being gripped by the fingers of the user at said second end thereof, said holder being adapted for application thereto of a length of pressure-sensitive tape to have a base portion of the tape extending adhesive side out across the base of the holder and folded around said opposite side edges of the base to have side portions extending over the sides of the holder also with the adhesive side of the tape out, said holder further having a pair of flaps, one at each side thereof, each flap having an end joined to the holder and extending over a respective side of the holder free of the respective side of the holder toward the respective side edge of the base of the holder, the flaps being capable of being swung out for the folding of the tape around the opposite side edges of the base to have the said side portions of the tape extend over the sides of the holder, and then being pressed down against said side portions of the tape for being adhesively secured to said side portions, said flaps being peelable away from said side portions for replacement of the tape, the holder with the tape thereon being adapted to be gripped by the fingers of the user at its said second end and moved to press the adhesive face of said base portion of the tape against an item to be gripped adhesively to grip said item, said method comprising extruding plastic to form an extrusion having a body portion and flap portions at opposite sides of the body portion integral therewith and segmenting said extrusion into individual units each comprising a holder with the integral flaps.

* * * * *